(12) United States Patent
Ash

(10) Patent No.: US 10,128,790 B2
(45) Date of Patent: Nov. 13, 2018

(54) ELECTRICAL BONDING SPLICE FOR SOLAR PANEL RAIL GUIDES

(71) Applicant: Ironridge, Inc., Hayward, CA (US)

(72) Inventor: Jon Ash, Phoenix, AZ (US)

(73) Assignee: Ironridge, Inc., Hayward, CA (US)

(*) Notice: Subject to any disclaimer, the term of this patent is extended or adjusted under 35 U.S.C. 154(b) by 0 days.

(21) Appl. No.: 15/805,196

(22) Filed: Nov. 7, 2017

(65) Prior Publication Data

US 2018/0102729 A1    Apr. 12, 2018

Related U.S. Application Data

(62) Division of application No. 15/252,720, filed on Aug. 31, 2016, now Pat. No. 9,837,954.

(60) Provisional application No. 62/324,321, filed on Apr. 18, 2016, provisional application No. 62/212,468, filed on Aug. 31, 2015.

(51) Int. Cl.
*H02S 20/00* (2014.01)
*F24S 25/65* (2018.01)
*H01R 25/16* (2006.01)

(52) U.S. Cl.
CPC .............. *H02S 20/00* (2013.01); *F24S 25/65* (2018.05); *H01R 25/162* (2013.01); *Y02E 10/50* (2013.01)

(58) Field of Classification Search
CPC ...... H01R 25/14; H01R 25/16; H01R 25/161; H01R 25/162; H01R 25/164; H01R 25/165; H01R 9/26; H01R 9/2608; H01R 4/64; H02S 20/00; F24J 2/38; F24J 2/52
USPC .......................... 439/115, 210, 212, 213, 363
See application file for complete search history.

(56) References Cited

U.S. PATENT DOCUMENTS

| | | | | |
|---|---|---|---|---|
| 5,828,008 A | * | 10/1998 | Lockwood | H01R 4/26 174/138 R |
| 7,435,134 B2 | * | 10/2008 | Lenox | F24J 2/5245 439/567 |
| 7,449,635 B2 | * | 11/2008 | Wiant | H01R 4/304 174/68.2 |
| 7,780,472 B2 | * | 8/2010 | Lenox | F24J 2/5211 136/251 |
| 8,464,478 B2 | | 6/2013 | Tweedie | |

(Continued)

*Primary Examiner* — Edwin A. Leon
*Assistant Examiner* — Oscar Jimenez
(74) *Attorney, Agent, or Firm* — Law Office of Lance C. Venable, PLLC; Lance C. Venable

(57) ABSTRACT

In various representative aspects, an assembly for connecting and electrically bonding two solar panel rail guides is provided. More specifically, the assembly provides a novel and improved inner rail used as a splice that slides within the two solar panel rail guides and includes a serrated screw that is pre-installed within the splice. When installed, the two rail guides are brought together along the splice and meet at the point where the screw is located, the screw can then be tightened so that the serrations penetrate surface treatment layers on each of the rail guides so that the solar panel rail guides are secured and electrically coupled to each other. An alternate embodiment utilizes the inner splice to join two solar panel rail guides by sliding the splice within the inner contour of two solar panel rail guides, and utilizing a pair of bonding pins to electrically bond the splice and the two solar panel rail guides. A stop pin inserted into the splice provides a tactile connection point where the two solar panel guides can be joined together.

7 Claims, 8 Drawing Sheets

(56) References Cited

U.S. PATENT DOCUMENTS

| | | | |
|---|---|---|---|
| 8,740,163 B1* | 6/2014 | Taylor | F24J 2/5258 248/226.12 |
| 8,925,263 B2* | 1/2015 | Haddock | F24J 2/5258 136/251 |
| 8,991,065 B1 | 3/2015 | Schrock | |
| 9,057,542 B2 | 6/2015 | Schult et al. | |
| 9,166,522 B1* | 10/2015 | Zvanut | F24J 2/5258 |
| 9,170,034 B2* | 10/2015 | Bosler | E04D 3/3605 |
| 9,175,881 B2 | 11/2015 | Liu | |
| 9,231,518 B2 | 1/2016 | Cinnamon et al. | |
| 9,350,289 B1* | 5/2016 | Zvanut | H02S 20/23 |
| 9,472,912 B2* | 10/2016 | Schirmeier | H01R 25/162 |
| 9,620,870 B2* | 4/2017 | Schaefer | F24J 2/5245 |
| 9,647,157 B2* | 5/2017 | West | H01L 31/042 |
| 9,837,954 B2* | 12/2017 | Ash | H02S 20/00 |
| 2008/0244881 A1* | 10/2008 | Zante | F24J 2/5205 24/530 |
| 2008/0302928 A1* | 12/2008 | Haddock | E04F 13/0821 248/205.1 |
| 2009/0000220 A1* | 1/2009 | Lenox | F24J 2/5211 52/173.1 |
| 2011/0138585 A1* | 6/2011 | Kmita | F24J 2/5258 24/522 |
| 2011/0203637 A1 | 8/2011 | Patton et al. | |
| 2011/0214365 A1* | 9/2011 | Aftanas | F24J 2/5258 52/173.3 |
| 2011/0260027 A1* | 10/2011 | Farnham, Jr. | F24J 2/5207 248/309.1 |
| 2012/0037214 A1* | 2/2012 | Sagayama | F24J 2/523 136/251 |
| 2012/0152326 A1 | 6/2012 | West et al. | |
| 2012/0266946 A1* | 10/2012 | West | F24J 2/5205 136/251 |
| 2012/0298817 A1* | 11/2012 | West | F24J 2/5211 248/220.22 |
| 2013/0075152 A1 | 3/2013 | Mazzone | |
| 2013/0111713 A1 | 5/2013 | McPheeters | |
| 2013/0112248 A1 | 5/2013 | McPheeters | |
| 2014/0026946 A1 | 1/2014 | West et al. | |
| 2014/0260068 A1 | 9/2014 | Pendley et al. | |
| 2014/0311552 A1* | 10/2014 | Garrett | H02S 20/24 136/251 |
| 2015/0075588 A1 | 3/2015 | Franklin et al. | |
| 2015/0078806 A1 | 3/2015 | Schrock | |
| 2015/0162670 A1* | 6/2015 | Galla | H01R 43/01 29/872 |
| 2015/0204370 A1* | 7/2015 | Serizawa | H01R 4/304 411/411 |
| 2015/0270027 A1* | 9/2015 | Schrock | H01B 5/06 52/173.3 |
| 2016/0087578 A1 | 3/2016 | Cinnamon et al. | |
| 2016/0344338 A1* | 11/2016 | Schutz | H02S 20/23 |
| 2016/0372842 A1* | 12/2016 | Martin | H01R 4/26 |
| 2017/0170579 A1* | 6/2017 | Martin | H01R 4/26 |

* cited by examiner

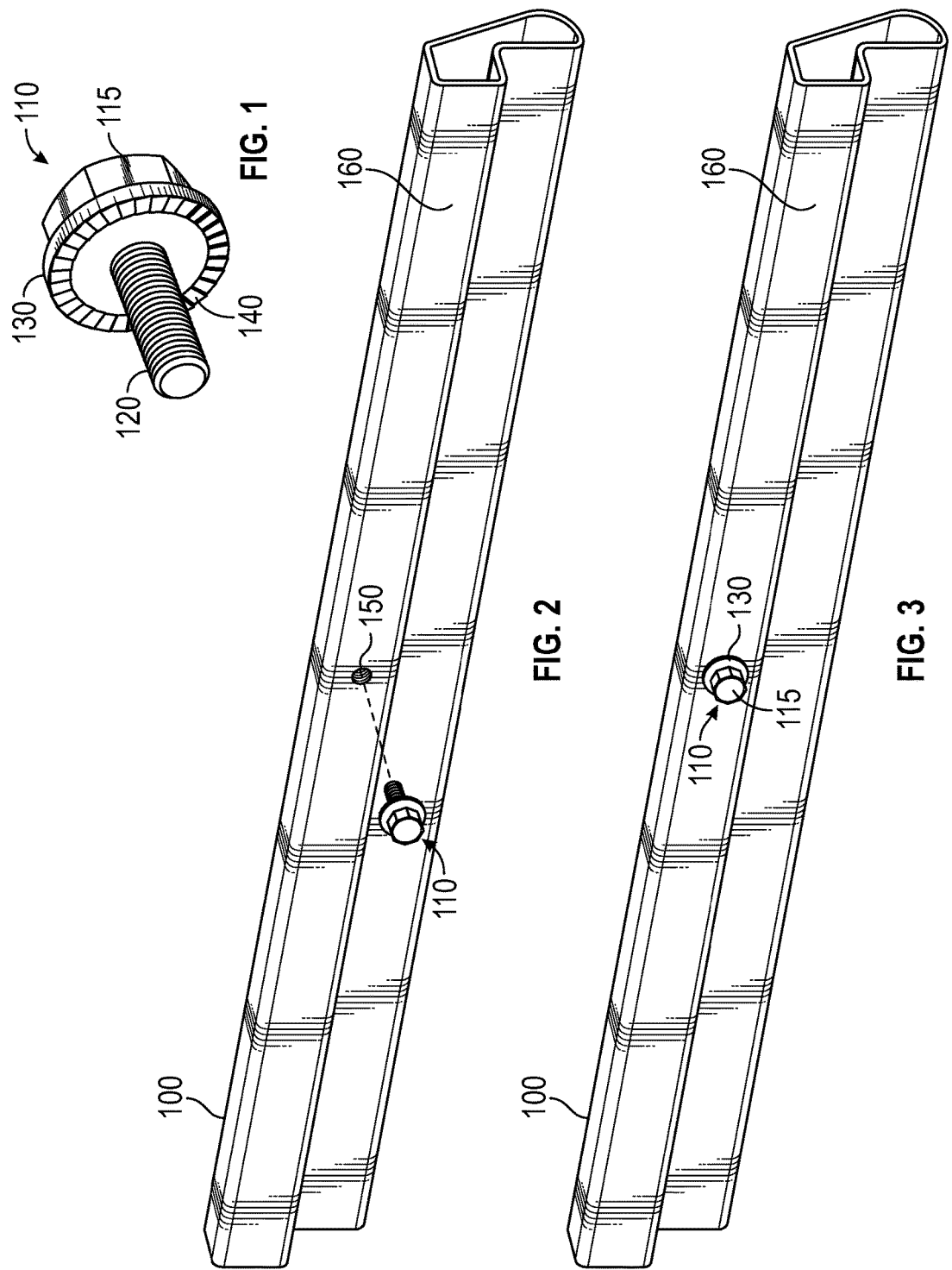

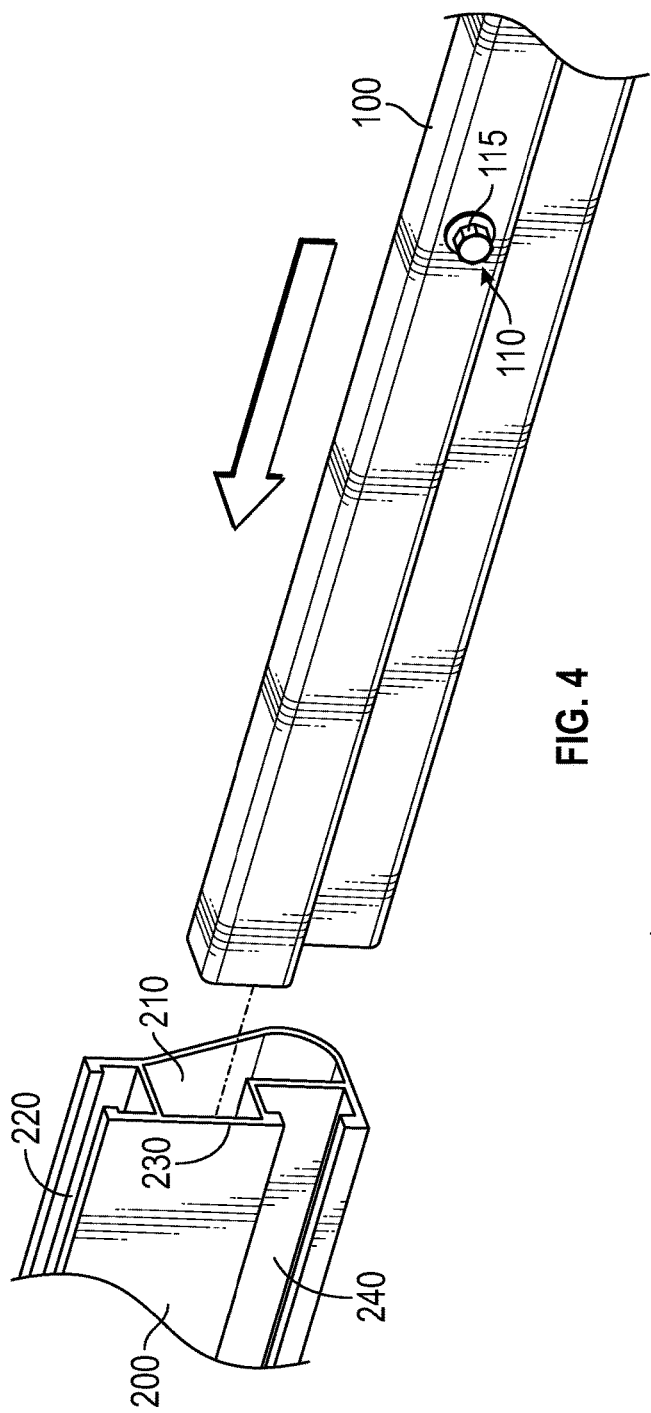
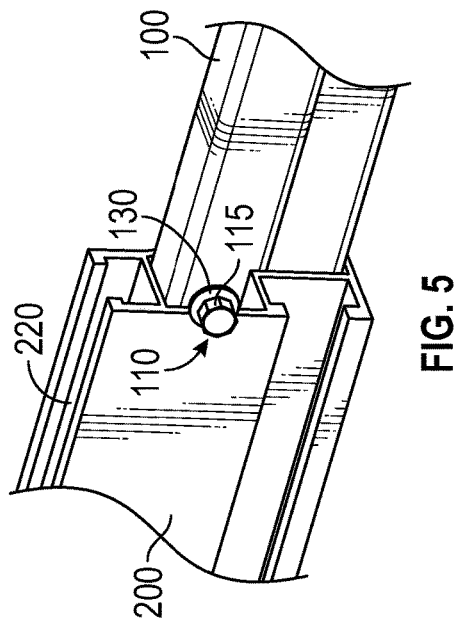

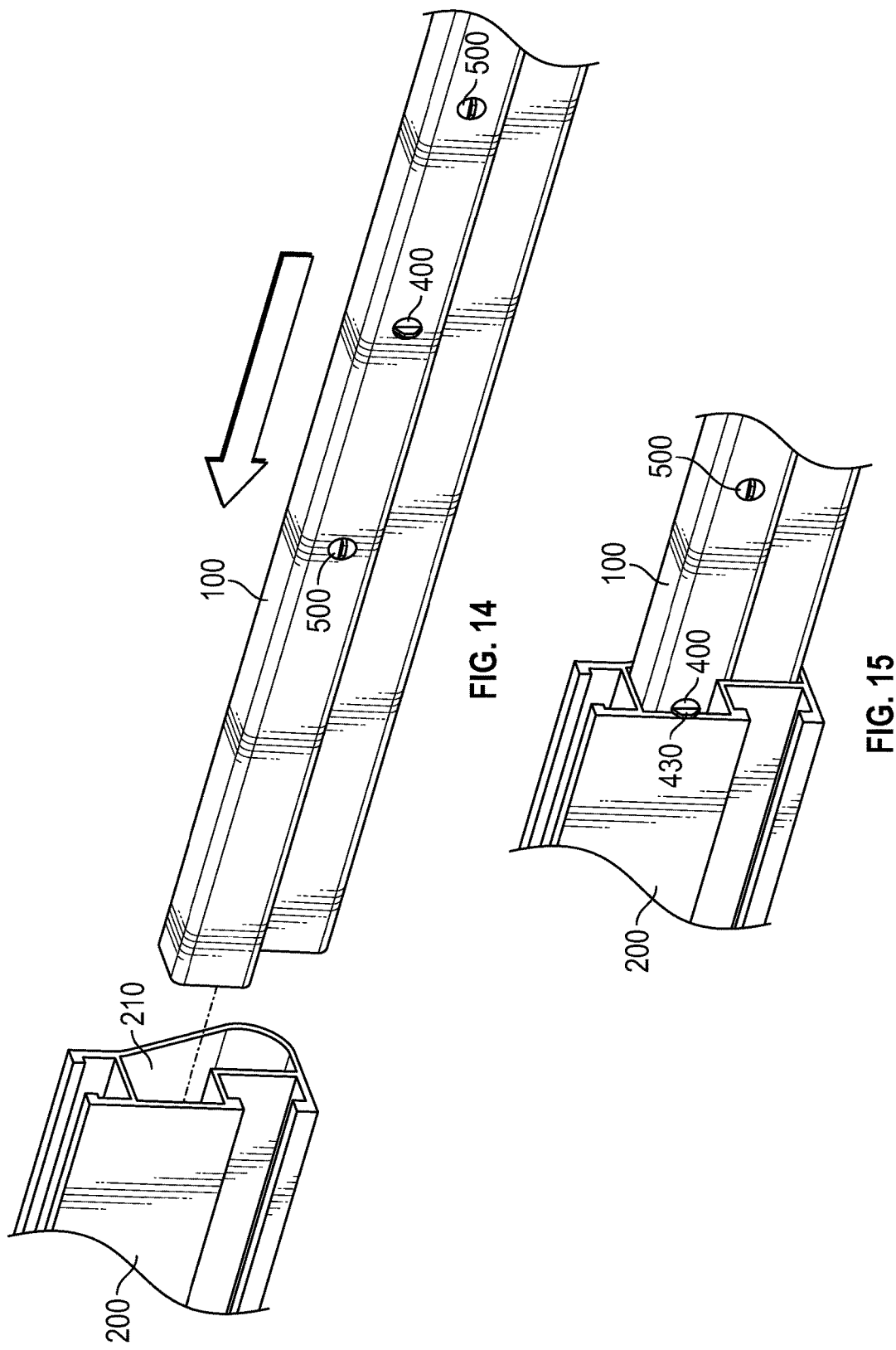

ELECTRICAL BONDING SPLICE FOR SOLAR PANEL RAIL GUIDES

BACKGROUND OF INVENTION

Field of the Invention

The present invention relates generally to an assembly for connecting and electrically bonding two solar panel rail guides. More specifically, the apparatus provides a novel and improved inner rail used as a splice that slides within the two solar panel rail guides and includes a serrated screw that is pre-installed within the splice. The screw's serrations are located on the bottom surface of the screw head. When the two rail guides are brought together along the splice and meet at the point where the screw is located, the screw can then be tightened so that the serrations penetrate surface treatment layers on each of the rail guides. When the surface treatment layers are penetrated by the serrations on the bottom surface of the screw, the serrations not only come in contact with the metal portions of the rail guides, but the screw electrically couples and secures the two rail guides to each other.

An alternate exemplary embodiment provides a novel and improved splice assembly that includes an inner splice that joins two solar panel rail guides by sliding within the inner contour of two solar panel rail guides, and utilizing a pair of bonding pins to electrically bond the splice and the two solar panel rail guides. An optional stop pin inserted into the splice provides a tactile connection point where the two solar panel guides can be joined along the splice.

Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. This is particularly true when the components must be installed on a roof that links to a rail guide structure for supporting the solar panel array. Within this type of structure, it is desirable to provide electrical connectivity between each rail guides.

Solar panel arrays typically extend for several feet across a roof. In many cases, several rail guides must be joined together to support the array. Internal bonding splices are often used to couple the rail guides together. And when the rail guides are coupled, they must be electrically connected as well.

One example of a current assembly for installing rail guides will now be discussed. A typical rail guide is a metallic structure with an oxidation layer that covers its surface. It is also normally hollow inside and extends for a given length. In order to join two rail guides, a connecting splice is often used. A connecting splice is also typically made of an electrical material that is coated with an oxidation layer over its entire surface. The connecting splice generally conforms to the shape of the inner-hollow shape of the rail guide. The splice is inserted into the hollow portions of each respective rail guide and joined together at a given point along the splice. The two rail guides are then electrically connected to each other by using a metallic grounding strap that is secured to each of the rail guides by screwing the ends of the strap to the edges of the rail guides typically no further than approximately an inch apart.

Although this type of assembly accomplishes the goal of both joining and electrically bonding the rail guides together, it also has several limitations. First, because the grounding strap has a given amount of slack that does not fully secure the rail guides together, the rail guides will always be able to move a small amount back and forth along the splice, which is not desirable. Second, because the splice is never stationary between the two rail guides and provides no tactile feedback where the middle of the splice is located, it is often difficult to align the two rail guides at the midpoint of the splice, which is the most desirable location. Third, it is desirable to electrically connect the two rail guides to the splice. In this assembly, that does not occur. Finally, the use of the strap requires extra time and parts to assemble the rail guides as part of the solar panel array structure.

Other existing solutions are also inadequate at addressing these concerns. For example, U.S. 2011/0203637 issued to Patton et al, discloses an assembly for joining two solar panel rail guides using a splice, but provides no means to maintain the splice in the desired center location while providing a means to bond the two rail guides with the splice. US 2014/0026946 issued to West et al discloses a splice for joining two solar panel rail guides, but offers no tactile feedback to center the splice where the rail guides are coupled together, nor does it offer any means to secure or electrically bond the rail guides to the splice. US 2014/0260068 issued to Pendley et al also discloses a splice used to connect to guides, but it provides no tactile feedback to center the splice, nor does it offer any means to electrically bond the rail guides to the splice or each other.

The present invention overcomes these limitations and offers a solution that provides means to use a single screw to both join a pair of rail guides at a central location along a splice, and electrically bond the rail guides and the splice together. In an alternate embodiment, the present invention offers a means for coupling a pair of rail guides at a central point along a splice that also secures and electrically bonds the rail guides and the splice together using a pre-formed insertion points that require minimal parts and no tools that is easy to install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an assembly for joining and electrically connecting two solar panel rail guides.

It is a further object of this invention that the assembly join the rail guides using an internal splice.

It is a further object of this invention that the splice includes a tactile feedback element for determining a central stopping point where the two rail guides are joined.

It is a further object of this invention that the tactile feedback element is also a bolt that includes a plurality of raised portions on a flange that extends outward from the head of the bolt is used to join, secure, and electrically couple the rail guides and the splice.

It is a further object of this invention that alternatively, the splice includes a pair of bonding pins inserted on opposite sides of the tactile feedback means such that the bonding pins each include a raised portion on the head of the bonding pin that is capable of penetrating the oxidation layer of the inner surface of the each of the rail guides.

It is a further object of the present invention that the raised portions on the bonding pins provide sufficient friction to restrict the rail guides from laterally moving once joined together at the tactile feedback location along the splice.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 1 illustrates a perspective view of an exemplary bolt.

FIG. 2 illustrates a perspective view of an exemplary solar panel rail guide splice with a prefabricated threaded hole for receiving the bolt shown in FIG. 1.

FIG. 3 is the same as FIG. 2 showing the bolt inserted into the hole shown in FIG. 1.

FIG. 4 illustrates a perspective view of the bolt and splice shown in FIG. 3 along with an exemplary solar panel rail guide showing the splice being inserted into the rail guide.

FIG. 5 illustrates a perspective view of the splice being fully inserted into the rail guide to the point where the bolt is located.

FIG. 14 illustrates a perspective view of the splice shown in FIG. 13 along with an exemplary solar panel rail guide showing the splice being inserted into the rail guide.

FIG. 15 illustrates a perspective view of the splice being fully inserted into the rail guide to the point where the stop pin is located.

DETAILED DESCRIPTION OF THE INVENTION

Figure 6:
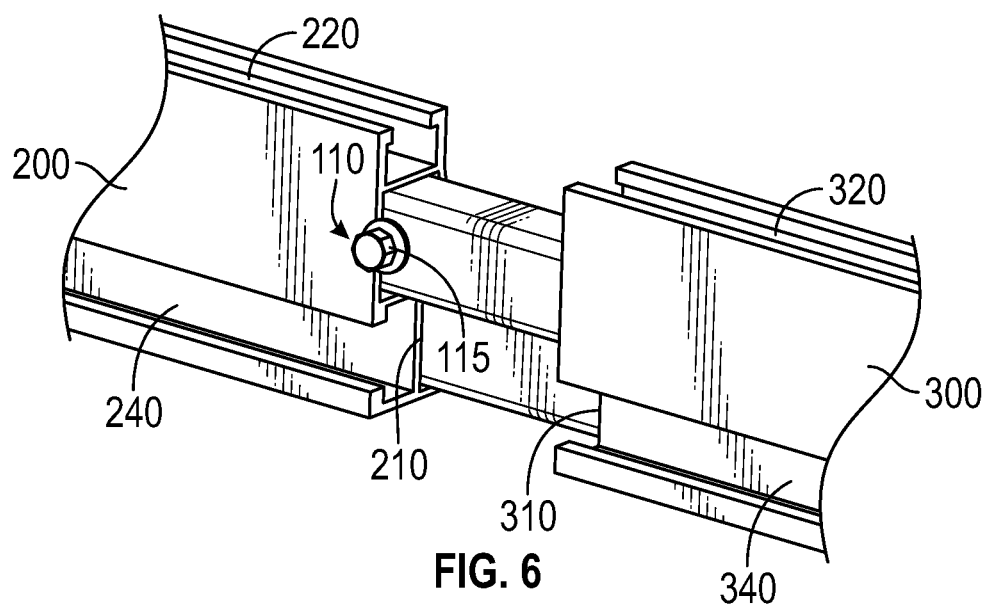
FIG. 6 illustrates a perspective view of FIG. 5 with the splice being inserted into a second rail guide.

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

FIG. 1 shows a perspective view of an exemplary embodiment of a screw 110. The screw 110 is typically made of metal or an electrically conducting material. Other variations of a screw, such as a nut and bolt combination may also suffice. The screw 110 includes a head 115. The head 115 is typically hexagonally shaped, but it can be any suitable shape that allows it to be rotated. In this embodiment, the head 115 also includes a flange 130. The flange 130 has a bottom surface that includes a plurality of serrations 140. It is understood by those skilled in the art that the head 115 and the flange 130 can be separate elements or a singular element where the bottom surface of the flange 130 is simply the bottom surface of the head 115. The serrations are sufficiently sharp so that when a force, such as a rotational force, is applied to the screw 110, the serrations can penetrate an oxidation layer of another metal object when they contact each other. The screw 110 also includes a threaded shaft 120 that is typically adapted to be coupled to a threaded aperture 150 as shown in FIG. 2.

FIGS. 2 and 3 show perspective views of a typical splice 100. The splice 100 shown can be of any suitable shape so long as it conforms to an opening with a similar shape within a solar panel rail guide 200 like the one shown in FIGS. 4 and 5, and it can be hollow or solid. The splice is also typically made of a metallic or electrically conducing material with an oxidation or surface treatment layer 160 on its outer surface. The splice 100 includes a threaded aperture 150. The aperture 150 is typically located in the center of the splice 100, but it is not limited to that location. FIG. 2 shows the screw 110 prior to being rotatably coupled to the splice and FIG. 3 shows the screw 110 fully inserted. One of ordinary skill in the art will also appreciate that the screw 110 could also be rotatably coupled to a splice 100 that does not have a pre-formed threaded aperture 150.

FIGS. 4 and 5 show the operational aspects of the assembly. The solar panel rail guide 200 as previously mentioned typically includes a top rail 220 and a side rail 240. These rails 220 and 240 are used to support additional parts of a solar panel array structure not shown. The solar panel rail guide 200 is also typically comprised of a metallic or electrically conducting material with an oxidation or surface treatment layer 230. As shown, the solar panel rail guide 200 is hollow inside and the opening 210 of the solar panel rail guide 200 generally conforms to the shape of the splice 100 and can provide a generally snug fit with the splice 100 when the splice 100 is inserted into the opening 210 of the solar panel rail guide 200. FIG. 4 shows the splice 100 prior to insertion into the opening 210 with the screw 110 coupled, but not yet tightened, to the splice 100. As shown in FIG. 5, when the splice 100 is fully inserted into the opening 210, the edge of the solar panel rail guide 200 fits between the flange 130 and the splice 100.

Figure 7:
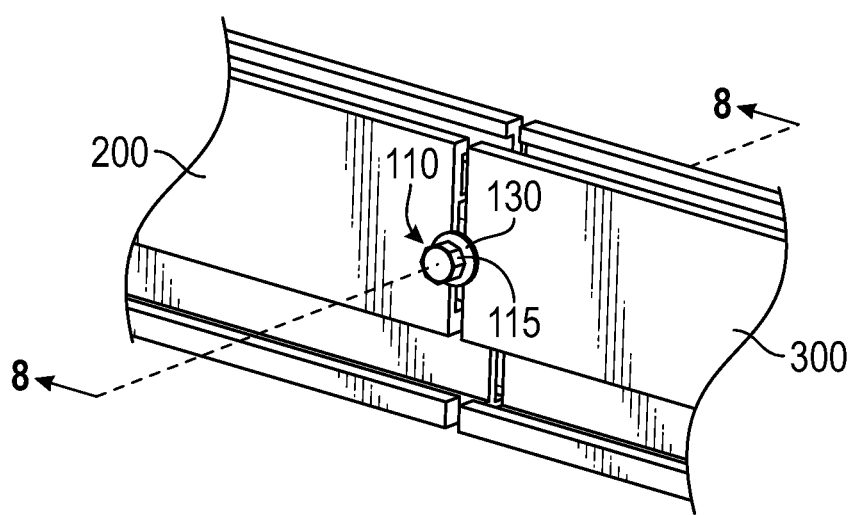
FIG. 7 illustrates a perspective view of the two rail guides being joined together where the bolt is located.

FIG. 6 shows the insertion of the opposite end of the splice 100 into a second solar panel rail guide 300 with rails 320 and 340 identical to the rails 220 and 240 of the first solar panel rail guide 200. The solar panel rail guide 300 is virtually identical in all aspects to those of solar panel rail guide 200. FIG. 7 shows the splice 100 fully inserted into rail guides 200 and 300 so that they fit between the flange 130 and the splice 100.

Figure 8:
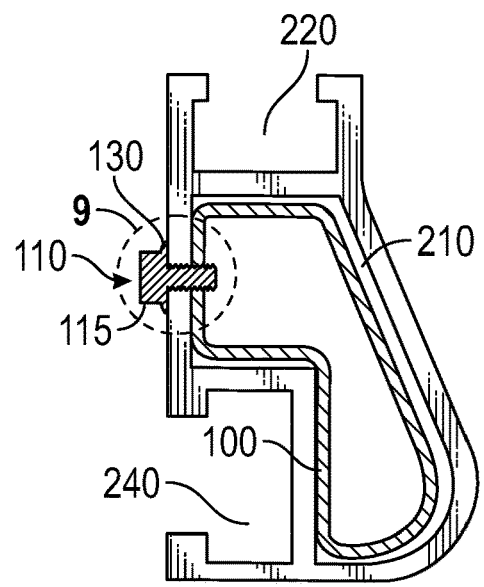
FIG. 8 is a cross-sectional view along point 8 in FIG. 7 showing the bolt being used to join and secure the splice and the two rail guides together.
Figure 9:
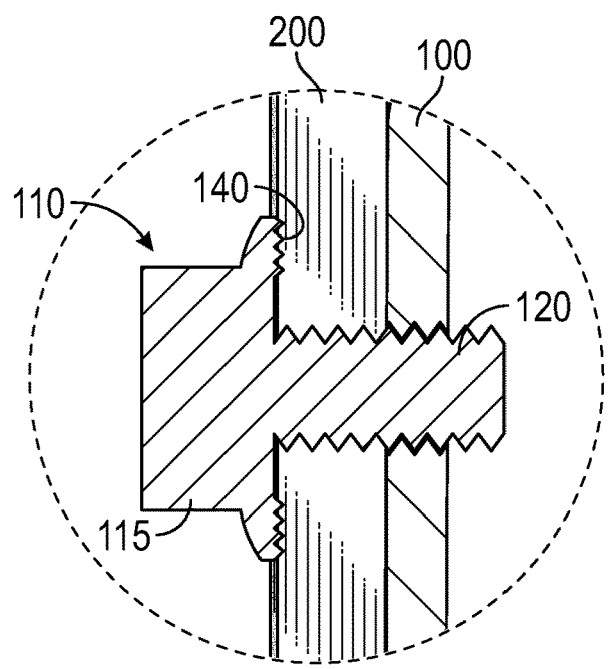
FIG. 9 is a close up view of the encircled portion 8 in FIG. 8 showing the bolt joining the two rail guides and the splice together and the raised portions on the bottom of the bolt's extended flange penetrating the surfaces of each of the rail guides.

FIG. 8 shows a cross-sectional view of point 8 in FIG. 7 that is looking straight into the first solar panel rail guide 200 and the splice 100 where the screw 110 is now fully tightened into the outer surface of the solar panel rail guides 200 and 300 although only 200 is shown here. The threaded shaft 120 is shown inserted into the splice 100. FIG. 9 is a close up view of the area showing how the serrations 140 have penetrated the oxidation layer 230 of the solar panel rail guide 200 so that they contact the conducting portion of the solar panel rail guide 200. When the solar panel rail guides 200 and 300 are in contact with the threaded shaft 120, and the screw 110 is fully tightened, the serrations 140 are able to grip the rail guides 200 and 300 so that they are secured and electrically coupled to each other.

Figure 10:
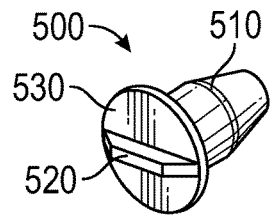
FIG. 10 illustrates an exemplary bonding pin.
Figure 11:
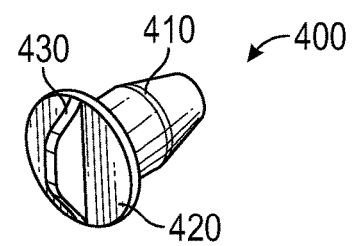
FIG. 11 illustrates an exemplary stop pin.
Figure 12:
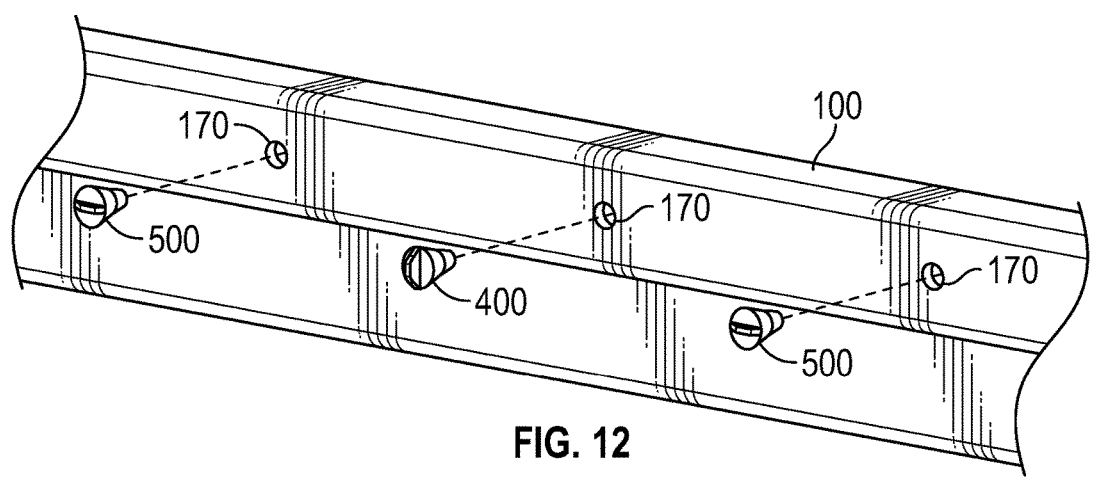
FIG. 12 illustrates a perspective view of an alternate splice with three prefabricated holes for receiving a pair of the bonding pins and the stop pin shown in FIGS. 10 and 11 respectively.

An alternate exemplary embodiment is also shown in FIGS. 10-19. FIGS. 10 and 11 illustrate perspective views a bonding pin 500 and a stop pin that serves as a tactile feedback element 400 respectively. The bonding pin 500 includes a shaft 510 that is typically adapted to fit within pin apertures 170 on the splice 100 as shown in FIG. 12. In describing this embodiment, it is presumed that the splice 100 is the same splice described in the previous embodiment of FIGS. 1-9 except that instead of including a threaded aperture 150, the splice 100 includes a plurality of pin apertures 170. Although the pin apertures 170 are all illustrated as being horizontally collinear, a person of ordinary skill in the art would understand that that they can exist anywhere along the length of the splice 100 so long as they are not vertically collinear. The bonding pin 500 also includes a flange 530 and includes a raised portion 520 on the top surface of the flange 530. The bonding pin 500 is typically comprised of a metallic or electrically conducting material that can form an electrical bond with the splice 100 when it is inserted, and the raised portion 520 is typically sharp enough to penetrate the oxidation or surface treatment layer 230 of the solar panel rail guides 200 and 300.

The stop pin or tactile feedback element 400 is similarly structured like that of the bonding pin 500. The stop pin 400 includes a shaft 410 that is adapted to snap into a pin aperture 170 of the splice, and it also includes a flange 420 with a protrusion 430 that extends outward from the top surface of the flange 420.

Figure 13:
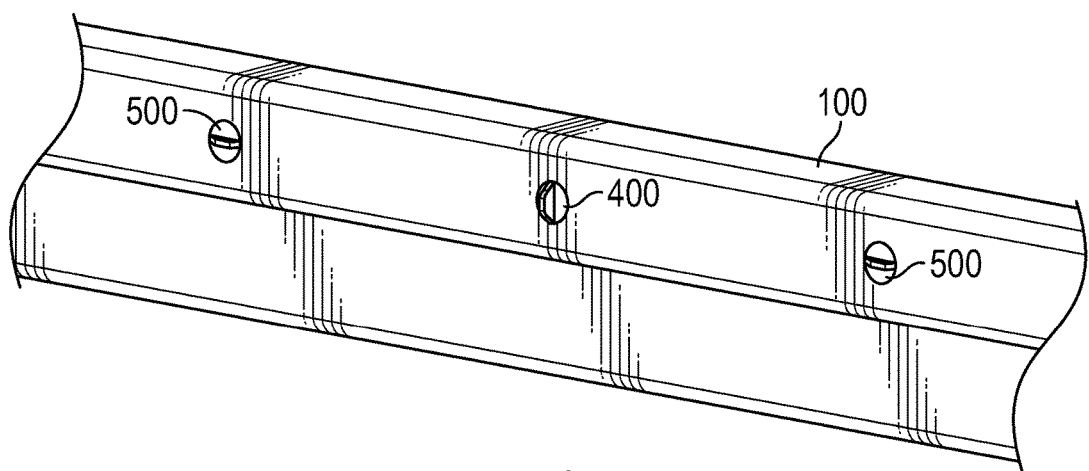
FIG. 13 illustrates a perspective view of the bonding pins and the stop pin fully inserted into the holes of the splice shown in FIG. 12.

When inserted into one of the pin apertures 170, the shaft 510 is typically snapped into the aperture 170 to secure it. It is also understood by one of ordinary skill in the art that the splice 100 can be pre-fabricated with the bonding pins 500 and the stop pin 400 along its length. FIGS. 12 and 13 show the splice before and after insertion of the stop and bonding pins 400 and 500 respectively. As shown in FIG. 13, the pins 400 and 500 have been inserted into the splice 100. Two differences between the stop pin 400 and the bonding pin 500 are that the stop pin 400 is typically not made of a conducting material, and the protrusion 430 is generally oriented vertically with respect to the edges of the splice 100, while the raised portions 520 of the bonding pins 500 are generally oriented horizontally with respect to the edges of the splice 100. This is so that the protrusion 430 is capable of providing a separation distance between the solar panel rail guides 200 and 300 when they are joined together as will be discussed below. The horizontal orientation of the raised portion 520 is primarily so that it not only can penetrate the oxidation layer of the splice 100 and form an electrical bond when the splice 100 is inserted into the solar panel rail guide 200 or 300, but that the raised portion 520 will provide sufficient resistance to the splice 100 so that it will remain stationary unless a sufficient force is applied to try to move the splice. If the raised portion 520 is oriented vertically, it can cause more-than-necessary oxidation layer to be removed from the inner surface of the rail guides 200 and 300.

FIGS. 14 and 15 show the operational aspects of the assembly. Just as with the previous embodiment described in FIGS. 1-9, the solar panel rail guide 200 typically includes a top rail 220 and a side rail 240. These rails 220 and 240 are used to support additional parts of a solar panel array structure not shown. The solar panel rail guide 200 is also typically comprised of a metallic or electrically conducting material with an oxidation or surface treatment layer 230. As shown, the solar panel rail guide 200 is hollow inside and the opening 210 of the solar panel rail guide 200 generally conforms to the shape of the splice 100 and can provide a generally snug fit with the splice 100 when the splice 100 is inserted into the opening 210 of the solar panel rail guide 200. FIG. 14 shows the splice 100 prior to insertion into the opening 210. As the splice 100 is inserted, the left-most bonding pin 500 is penetrating the oxidation layer (discussed below) of the rail guide 200 and creating an electrical contact between the splice 100 and the rail guide 200. As shown in FIG. 15, when the splice 100 is fully inserted into the opening 210, the edge of the solar panel rail guide reaches the protrusion 430 and can no longer move. It is presumed that the protrusion extends far enough out to prevent the rail guide 200 from moving passed it during insertion.

Figure 16:
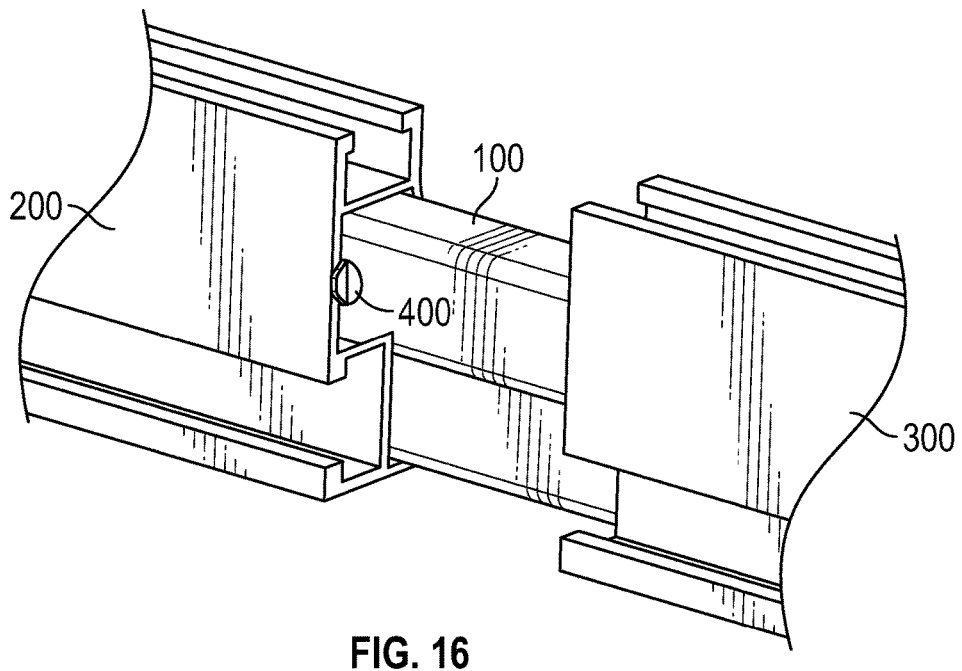
FIG. 16 illustrates a perspective view of FIG. 15 with the splice being inserted into a second rail guide.
Figure 17:
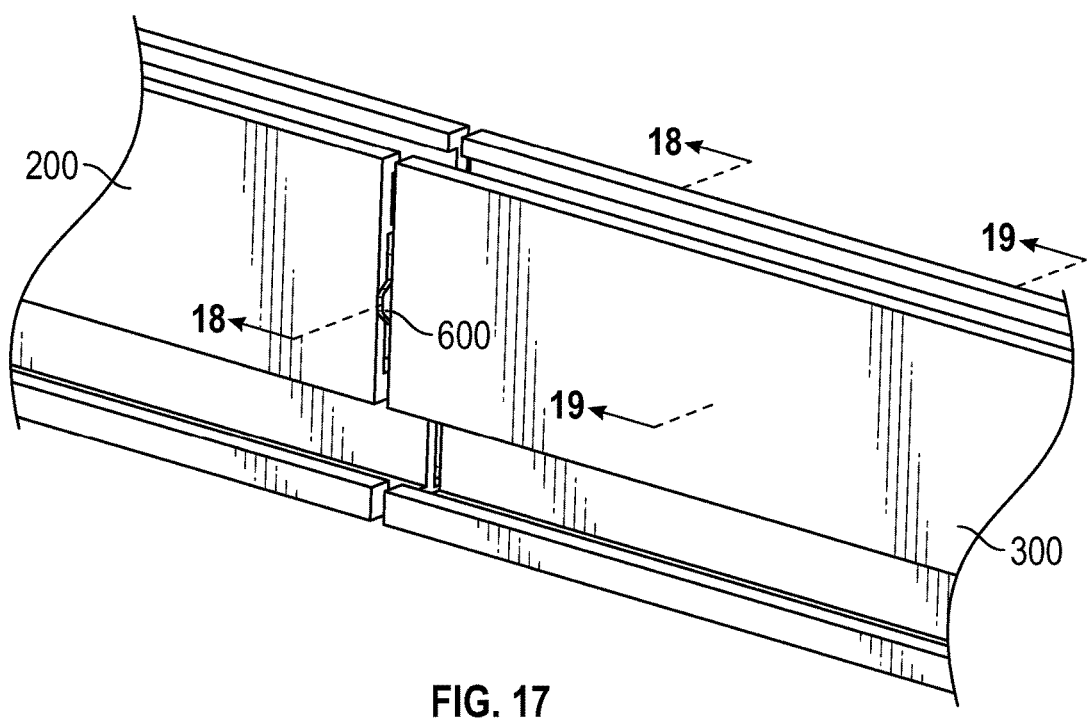
FIG. 17 illustrates a perspective view of the two rail guides being joined together where the stop pin is located.

FIG. 16 shows the insertion of the opposite end of the splice 100 into a second solar panel rail guide 300 and the raised portion 520 of the bonding pin 500 having penetrated the oxidation layer of the rail guide 300 and formed an electrical bond between the rail guide 300 and the splice 100. The solar panel rail guide 300 is virtually identical in all aspects to those of solar panel rail guide 200. FIG. 17 shows the splice 100 fully inserted into rail guides 200 and 300 so that they are separated only by the protrusion 430 of the stop pin 400.

Figure 18:
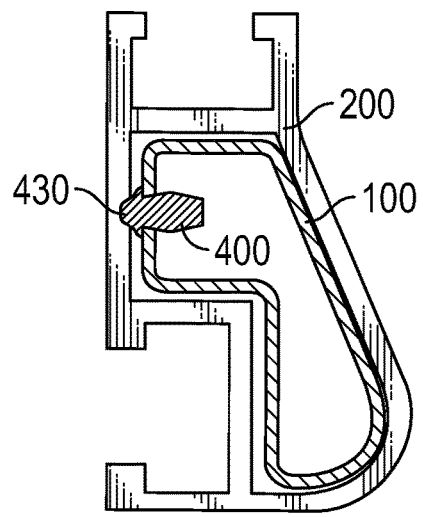
FIG. 18 is a cross-sectional view along point 9 in FIG. 17 showing the stop pin being used to maintain separation of the two rail guides.
Figure 19:
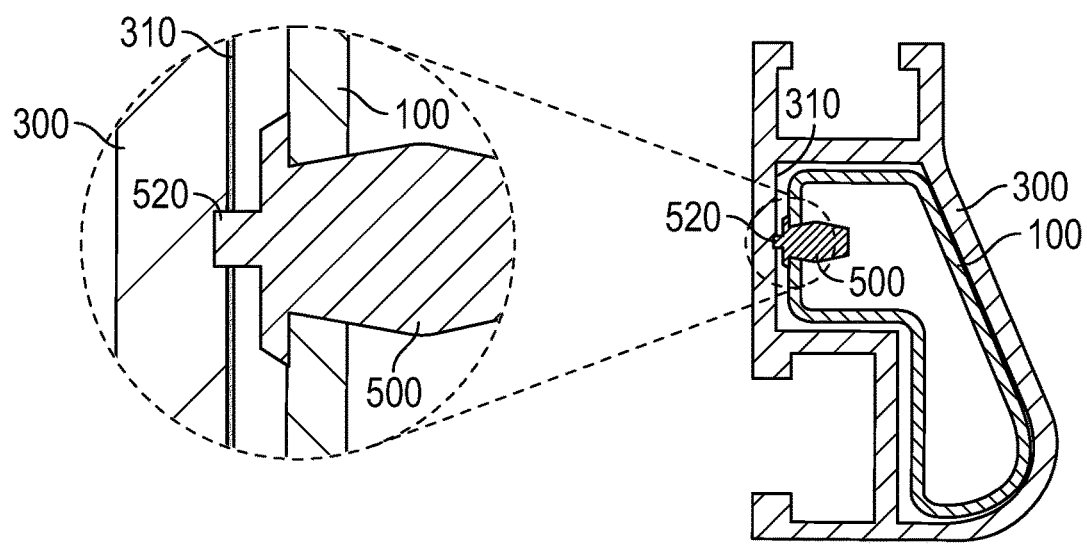
FIG. 19 is a close up view of the encircled portion 9 in FIG. 18 showing the raised portion of one of the bonding pins penetrating the inner surface oxidation layer of the right rail guide.

FIG. 18 shows a cross-sectional view of point 9 in FIG. 17 that is looking straight into the first solar panel rail guide 200 and the splice 100 where stop pin 400 is snapped into the splice 100 and the protrusion 430 separates the two rail guides 200 and 300. FIG. 19 is a close up view of point 10 in FIG. 17 that is looking straight into the second solar panel rail guide 300 and the splice 100 where the bonding pin 500 is snapped into the splice 100 and the raised portion 520 has penetrated the oxidation layer 310 of the rail guide 300 and formed the electrical bond between the rail guide 300 and the splice 100. When the solar panel rail guides 200 and 300 are in contact with the bonding pins 500, the raised portions 520 are able to grip the rail guides 200 and 300 so that they are secured and electrically coupled to each other.

What is claimed is:

1. An assembly comprising:
   a. a first rail guide further comprising:
      i. an outer surface having an oxidation layer; and
      ii. an inner cavity;
   b. a splice configured for insertion into the inner cavity of the first rail guide further and the splice further comprising a threaded aperture; and
   c. screw comprising:
      i. a first and second end;
      ii. the first end comprising a threaded shaft adapted to be inserted into the threaded aperture of the splice;
      iii. the second end comprising a head wherein the bottom surface of the head further comprises a plurality of serrations configured to penetrate the oxidation layer of the first rail guide.

2. The assembly of claim 1 wherein the shape of the head is circular.

3. The assembly of claim 1 wherein the shape of the splice substantially conforms to the shape of an opening within the first rail guide.

4. An assembly for joining and electrically bonding a pair of objects comprising:
   a. a pair of solar panel rail guides each of the solar panel rail guides further comprising:
      i. an outer surface having an oxidation layer; and
      ii. an inner cavity;
   b. a splice configured for insertion into the respective inner cavities of the pair of solar panel rail guides, the splice further comprising a threaded aperture; and
   c. a screw comprising:
      i. a first and second end;
      ii. the first end comprising a threaded shaft adapted to be inserted into the threaded aperture of the splice;
      iii. the second end comprising a head wherein the bottom surface of the head further comprises a plurality of serrations configured to penetrate an oxidation layer of the pair of solar panel rail guides and the width of the head is sufficient to enable the serrations to couple and secure the pair of solar panel rail guides when the splice is inserted into the pair of solar panel rail guides on opposite ends of the splice and the screw is sufficiently tightened in the threaded aperture while contacting the pair of solar panel rail guides.

5. The assembly of claim 4 wherein the shape of the head is circular.

6. The assembly of claim 4 wherein the shape of the splice substantially conforms to the shape of an opening within the solar panel rail guides.

7. An assembly for joining and electrically bonding a pair of solar panel rail guides comprising:
   a. a first solar panel rail guide further comprising:
      i. an outer surface having an oxidation layer; and
      ii. an inner cavity;
   b. a second solar panel rail guide further comprising:
      i. an outer surface having an oxidation layer; and
      ii. an inner cavity;
   c. a splice configured for insertion into the respective inner cavities of the first and second solar panel rail guides, the splice further comprising a threaded aperture; and
   d. a screw comprising:
      i. a first and second end;
      ii. the first end comprising a threaded shaft adapted to be inserted into the threaded aperture of the splice;
      iii. the second end comprising a head wherein the bottom surface of the head further comprises a plurality of serrations configured to penetrate the oxidation layer of the pair of solar panel rail guides.

* * * * *